United States Patent [19]

Kopp et al.

[11] Patent Number: 5,499,318

[45] Date of Patent: Mar. 12, 1996

[54] METHOD AND APPARATUS FOR ACCESS CONTROL BASED ON AN AUDIBLE UTTERING AND TIMING OF THE AUDIBLE UTTERING

[75] Inventors: Dieter Kopp, Hemmingen; Thomas Hörmann, Grossbottwar; Susanne Dvorak, Asperg; Uwe Ackermann, Freiberg, all of Germany

[73] Assignee: Alcatel n.v., Amsterdam, Netherlands

[21] Appl. No.: 387,388

[22] Filed: Feb. 13, 1995

Related U.S. Application Data

[63] Continuation of Ser. No. 29,474, Mar. 11, 1993, abandoned.

[30] Foreign Application Priority Data

Mar. 12, 1992 [DE] Germany .......................... 42 07 837.7

[51] Int. Cl.⁶ .................................................. G10L 9/00
[52] U.S. Cl. .................... 395/2.82; 395/2.84; 395/2.55
[58] Field of Search .................................... 395/2.4, 2.55, 395/2.79, 2.82, 2.84, 2.52, 2.6; 381/41, 42, 43; 379/76, 77, 80

[56] References Cited

U.S. PATENT DOCUMENTS

| | | | |
|---|---|---|---|
| 3,456,080 | 7/1969 | Torre | 381/42 |
| 3,588,356 | 6/1971 | Moshier et al. | 381/42 |
| 3,715,506 | 2/1973 | Haag et al. | 379/80 |
| 4,060,695 | 11/1977 | Suzuki et al. | 381/42 |
| 4,109,104 | 8/1978 | Toyoshima | 381/42 |
| 4,363,102 | 12/1982 | Holmgren et al. | 395/2.55 |
| 4,400,586 | 8/1983 | Hanscom | 379/77 |
| 4,481,384 | 11/1984 | Matthews | 379/188 |
| 4,543,537 | 9/1985 | Kuhn | 330/129 |
| 4,549,046 | 10/1985 | Mock et al. | 379/77 |
| 4,653,097 | 3/1987 | Watanabe et al. | 395/2.82 |
| 4,827,519 | 5/1989 | Fujimoto et al. | 381/42 |
| 4,864,622 | 9/1989 | Iida et al. | 395/2.79 |
| 4,922,538 | 5/1990 | Tchorzewski | 395/2.84 |
| 5,050,206 | 9/1991 | Shimanuki | 379/80 |
| 5,127,043 | 6/1992 | Hunt et al. | 381/42 |
| 5,265,191 | 11/1993 | McNair | 395/2.82 |
| 5,339,385 | 8/1994 | Higgins | 395/2.82 |

FOREIGN PATENT DOCUMENTS

| | | |
|---|---|---|
| 0397399 | 11/1990 | European Pat. Off. . |
| 3314570A1 | 10/1984 | Germany . |

OTHER PUBLICATIONS

C. Ulrichs and M. Immendörfer, "Acoustic Dialing Aid: Obeys Your Every Word," *Funkschau*, No. 15/1986, pp. 48–50 (English Translation of German Article Akustisch Wähihkfe: Gehorcht Aufs Wort).

G. D. Bergland et al., entitled "New Custom Calling Services", ISS, Paris, 7–11, May 1979, pp. 1256 to 1262.

"Funkschau Fernsprechtechnik", No. 15/1986, Gehorcht aufs Wort, pp. 48 to 50.

*Primary Examiner*—Allen R. MacDonald
*Assistant Examiner*—Michael A. Sartori
*Attorney, Agent, or Firm*—Frishauf, Holtz, Goodman, Langer & Chick

[57] ABSTRACT

A method and an apparatus provide safe access control without the need for supplementary devices. By entering audible words or sounds during a playing of a text of a recorded announcement, a first personal access code based on both the audible uttering and the timing of the audible uttering is generated and stored for authorized users. Subsequently, a second personal access code is generated in the same way when access is sought by a subsequent user seeking access to the facility. The second personal access code is compared with the first personal access code. If the codes correspond in both terms of the audible uttering and the timing of the audible uttering, access is permitted. High security is provided which prevents unauthorized use. The apparatus has a low cost and a low complexity, because no supplementary devices are necessary.

17 Claims, 3 Drawing Sheets

METHOD AND APPARATUS FOR ACCESS CONTROL BASED ON AN AUDIBLE UTTERING AND TIMING OF THE AUDIBLE UTTERING

This application is a Continuation of application Ser. No. 08/029,474, filed Mar. 11, 1993, now abandoned.

FIELD OF THE INVENTION

The present invention relates to a method and an apparatus for providing access control to a restricted facility.

DESCRIPTION OF THE PRIOR ART

One possibility of controlling access to facilities, such as voice storage systems, is to enter a sequence of digits by dual tone multifrequency (DTMF) signaling which is described in an article by G. D. Bergland et al., entitled "New Custom Calling Services", appearing in the Proceedings of the ISS, Paris, 7–11, May 1979, pages 1256 to 1262. However, many telephone sets do not use multifrequency codes for signaling. Therefore, recourse must be had to supplementary devices, which are difficult to handle and may cause malfunctions, in order to enable non-multifrequency telephone sets to operate.

Another possibility is to carry out voice recognition or speaker identification by asking the user to enter an access word as suggested in an article in "Funkschau Fernsprechtechnik", Number 15/1986, entitled "Gehorcht aufs Wort", appearing on pages 48 to 50. This proposal, however, is too unsafe, since the error rate is between 20 and 30%. In addition, this approach is very expensive to implement, since speech processing is performed in real time, which requires considerable storage capacity.

SUMMARY OF THE INVENTION

It is the object of the invention to provide a method and an apparatus which permits safe access control by the simplest possible means.

This object is attained by providing a method and apparatus for controlling access by a user to facilities having acoustic input and output means which comprises:

storing in a memory, a first personal access code for authorized users which is generated by an audible uttering, during a playing of a text, of freely selectable words or portions of words or sounds;

subsequently, during operation of the system, a user must repeat said freely selectable words or portions of words or sounds and the system detects a second personal access code from the repeated freely selectable words or portions of words or sounds by the user trying to obtain access to the system; and comparing the stored first personal access code with the second personal access code generated in response to the user trying to obtain access to the system;

if the first personal access code and the second personal access code correspond with each other, then the user is given access to the facilities; and if the codes do not correspond with each other, the user is only given access to a portion of the system.

In order to provide further security in the system, the user trying to enter the system may be required to repeat the freely selectable words or portions of words or sounds at a particular time during the playback of the text; and if the timing is not correct, then the user may not be given full access to the facilities.

One advantage of the invention is that, by using simple means (and without the need for a supplementary device, which, particularly if used together with modern telephones, is very difficult to handle and is prone to error), a second access code is generated by entering audible signals which are compared with a previously generated first personal access code.

Another advantage of the invention is that, compared with the error rate during access control by prior art voice recognition or speaker identification systems, safety from unauthorized use is increased, and the implementation of the present invention is possible by simpler means than is possible using speech processing.

Voice recognition or speaker identification can also be performed, in addition to the security provided by the present invention, to increase security. After a personal access code has been generated and compared with a previously generated first personal access code in accordance with the technique of the present invention, the user can also be requested to enter an audible password. This password is used either for voice recognition or for speaker identification. Only if the password additionally agrees with a stored password will a user be allowed access to the facility.

In addition to the steps mentioned above, the user can be requested to enter a digital personal identification number (PIN) in the form of digits. The digital code can be entered by dual tone multifrequency signaling and also serves to increase the safety from unauthorized use.

With the technique of the present invention, limited operating and executing means can still be made available to a non-pre-authorized user. If the comparison between the second access code generated during operation of the invention and the first access code generated prior to start-up indicates a mismatch, access to a limited number of operating and executing means can still be given to the unauthorized user via these operating and executing means, as well as access to some other means which have no effect on the operation of the facility. These other means can be activated specifically for the non-authorized user.

BRIEF DESCRIPTION OF THE DRAWINGS

An embodiment of the invention will now be explained with reference to the accompanying drawings, in which.

DETAILED DESCRIPTION

Figure 1:
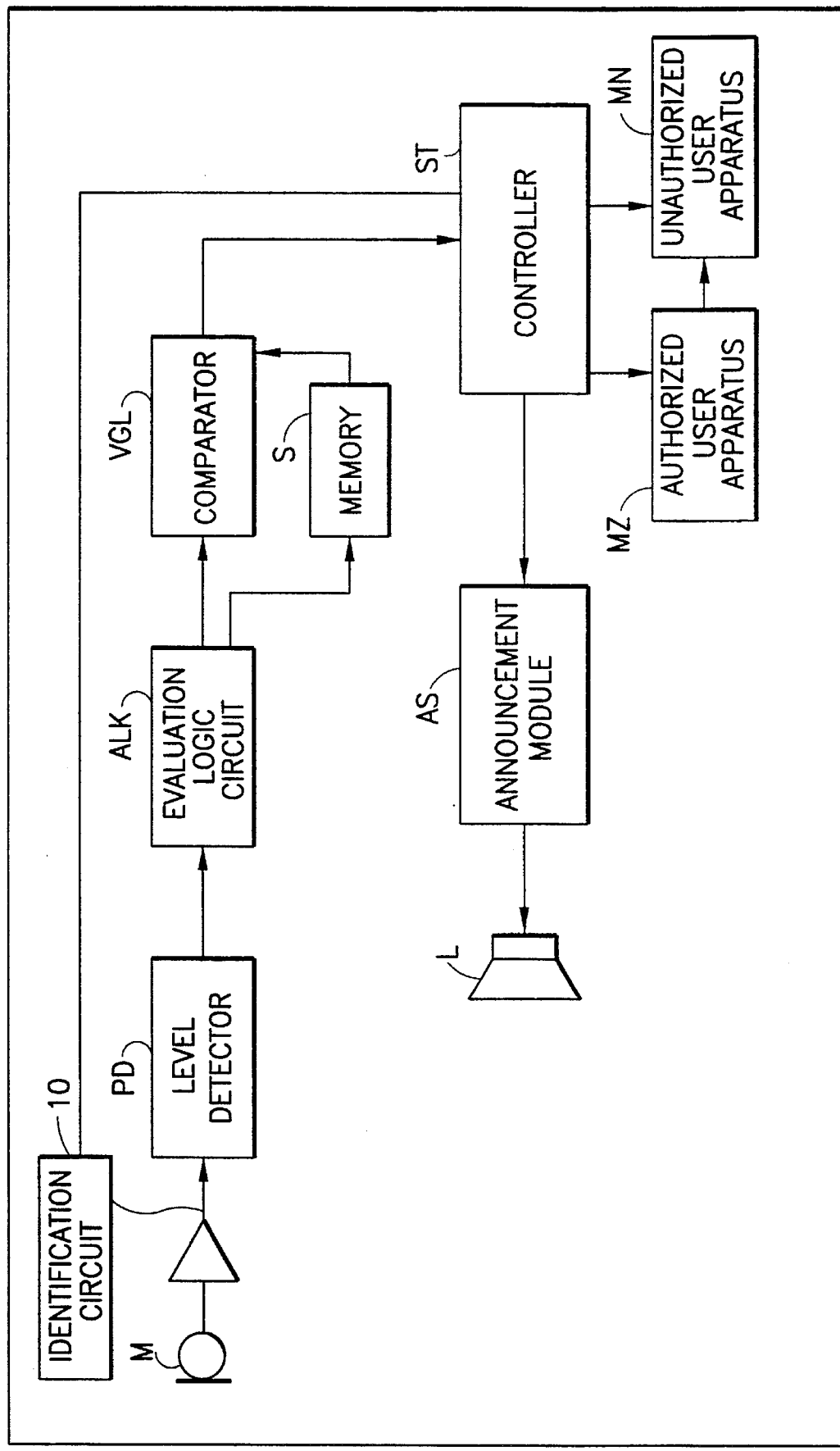
FIG. 1 is a block diagram of the access control apparatus in accordance with the invention.

The apparatus shown in FIG. 1 can be operated as a stand-alone system or as part of a larger system.

Referring to FIG. 1, an access control apparatus according to the invention includes a microphone M for entering audible signals, a level detector PD connected to the microphone, via an amplifier 110 and an evaluation logic circuit ALK coupled to the level detector PD. The evaluation logic circuit ALK is connected directly and through a memory S to a comparator VGL. The comparator is connected to a controller ST. The controller ST is connected to an announcement module AS which, in turn, is connected to an acoustic output means, such as a loudspeaker L. The controller ST is also connected to apparatus for unauthorized users MN and to apparatus for authorized users MZ. The apparatus for unauthorized users MN can also be made to be accessible to authorized users through the apparatus for authorized users MZ.

In operation, an audible uttering or sound or sound level is picked up by the microphone M, amplified in amplifier 110, and applied to the level detector PD. Level Detector PD performs an energy calculation using an integrator that operates at, for example, a 20-ms clock rate.

The evaluation circuit ALK includes a comparator which determines whether the value previously detected by the level detector PD lies above a threshold. A logic value 1 is set for values above the logic threshold, and a logic level 0 is set for values below the threshold. As a result, the evaluation circuit ALK produces an output consisting of strings of zeros and ones. The comparator circuit VGL compares the patterns of zeros and ones received from memory S and from evaluation logic circuit ALK and determines whether they correspond to each other. The controller ST comprises a conventional CPU. The announcement circuit AS has a PCM data output capability and includes a speech synthesis module for example, an LPC (linear predictive coder) which uses a 10 point speech synthesis technique which is well-known in the speech processing art.

Figure 3A:
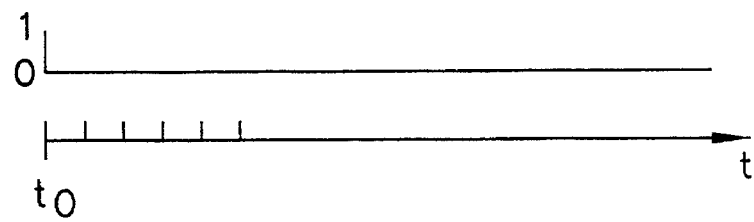
FIG. 3A shows a waveform pattern that is generated by a non-authorized user by the evaluation circuit ALK.
Figure 3B:
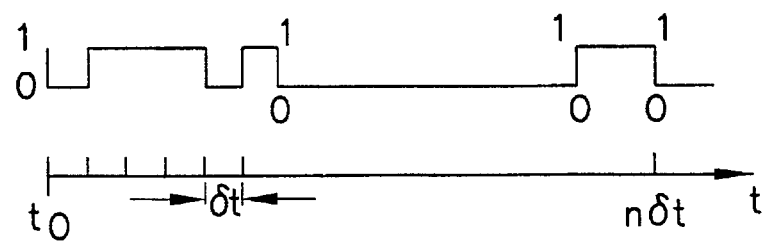
FIG. 3B shows a waveform pattern that is generated by an authorized user by evaluation circuit ALK, and which can be stored in memory S.
Figure 3C:
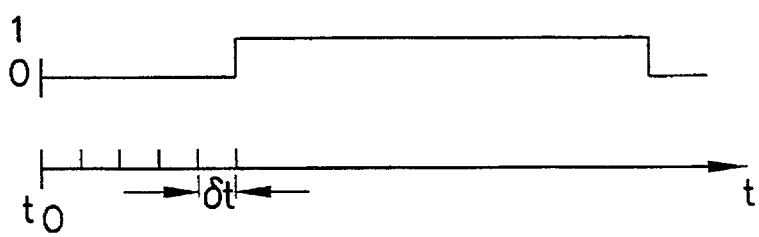
FIG. 3C shows another waveform pattern that is generated for an unauthorized user by evaluation circuit ALK, when the unauthorized user seeks to gain access to the facilities.

To create an authorized user personal access code, a person in a preliminary storage operation, will speak into the microphone M. The uttering of the person speaking into the microphone M will include the freely selectable words or sounds mentioned hereinabove. The level detector PD will receive the output from the microphone M via amplifier 110 and, the level detector PD detects the level of the signals received from the microphone M at times $t_0$, $t_0+\delta t$, $t_0+2\delta t$ ... $t_0+n\delta t$ as shown in FIG. 3B. The outputs from the level detector PD are supplied to the evaluation logic circuit ALK as shown in FIG. 1. The output from the level detector PD is characteristic of the audible uttering of all authorized users. The evaluation circuit ALK responsive to the outputs from the level detector PD generates strings of zeros and ones as shown in FIGS. 3A, 3B and 3C. The output of the evaluation logic circuit ALK is supplied to and stored in the memory S and is the personal access code for all authorized users.

Subsequently, when any user tries to gain access to the facilities, the user will speak into the microphone M which generates an output signal which is coupled to the level detector PD. The level detector PD operates as indicated above for the authorized users and detects levels of the signal from the microphone at times $t_0$, $t_0+\delta t$, $t_0+2\delta t$ ... $t_0+n\delta t$ as shown in FIGS. 3A, 3B and 3C. Responsive to these outputs from the level detector PD, the evaluation logic circuit ALK will generate strings of zeros and ones as shown in FIGS. 3A, 3B and 3C. The output from the evaluation logic circuit ALK is provided to the comparator VGL. The authorized user waveform stored in memory S is the first personal access code generated in the system. The waveform generated in response to a user seeking access to the system, provided by the evaluation circuit ALK, is the second personal access code. Comparator VGL compares the first personal access codes stored in the memory S (see FIG. 3B) with the second personal access code provided in response to the user seeking access to the system (FIG. 3A or 3C).

The comparison result of comparator VGL is transmitted to the controller ST. If the first and second personal access codes correspond to each other, means for authorized users MZ will be accessible to the user. In case of disagreement or in the absence of a personal access code, the means for unauthorized users MN will be made accessible to the user. The means for unauthorized users MN offers a limited number of functions which are also usable by authorized users through apparatus MZ.

An announcement text is fed from the announcement module AS to the loudspeaker L in response to an output of controller ST, and is thus made audible to a user seeking access to the facility which may be the apparatus of FIG. 1 to be part of a larger system of a telecommunication terminal or data terminal.

Figure 2:
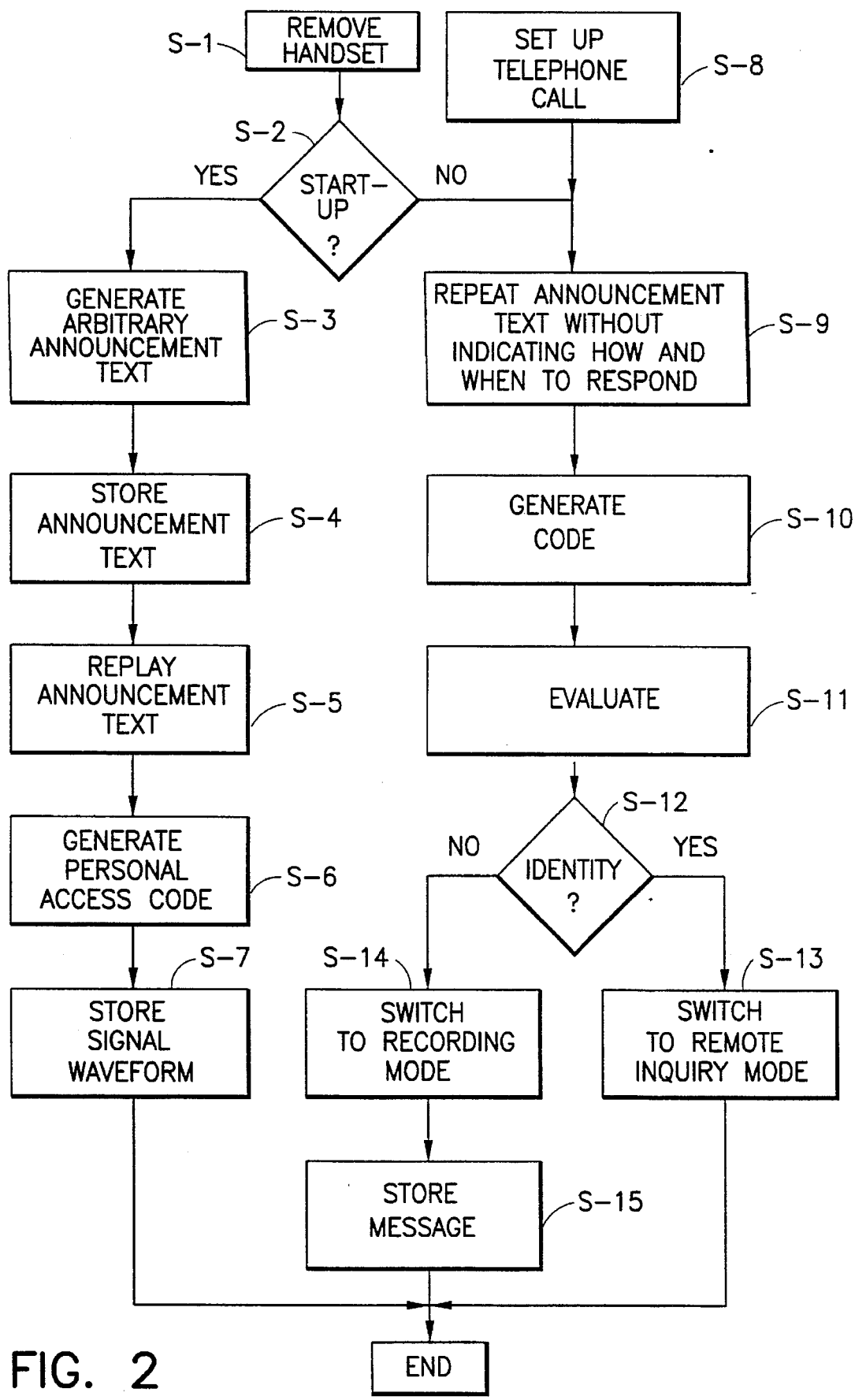
FIG. 2 is a flowchart that explains the access control method in accordance with the invention.

FIG. 2 illustrates an embodiment of the invention wherein the system disclosed in FIG. 1 is used in conjunction with a telephone answering set (i.e., it is part of a telecommunication terminal 11). In other words, the apparatus shown in FIG. 1 may be included in a telephone answering set or may be an adjunct to a telephone answering set.

In the following, the access control method of the invention will be explained with reference to FIG. 2 for an application where a telephone answering set in a telecommunications terminal 11 is switched to a remote inquiry mode.

After removal of the handset of the telecommunications terminal 11 by a user in step S-1, the system decides whether to start up in step S-2. If yes, an pre-stored announcement text (steps S-3 and S-4) stored in the telephone answering set is played back to the user (step S-5).

During the playback, an audible signal is produced by the user by uttering an arbitrary number of freely selectable words or word portions or sounds, e.g., by whistling or by producing any other sound level. These audible signals are converted to strings of zeros and ones which form the first personal access code (Step S-6) stored in memory S (in step S-7) in the manner explained with reference to FIG. 1. The first personal access code (step S-6) corresponds to the audibly uttered words or sounds and is stored in the memory S for users who are to be authorized to access the facility (step S-7). The first personal access code is the same for all authorized users.

During operation, the handset is removed (step S-1) and after establishment of a telephone call at step S-2 between the user's telephone and the telephone with the telephone answering set (step S-8) connected thereto, the announcement text stored in announcement module AS (step S-9) is repeated. Simultaneously with the repetition (playing) of the announcement text, a second personal access code is generated in step S-10 when the user seeking access to the facility repeats the same audible words or sounds or the same sound level which were previously used to generate the first personal access code that is stored in the memory S during step S-6). Specifically, a previously recorded announcement text is played back to the user seeking access to the facilities. This text, for example, may state: "Hello, this is the telephone answering set of Paul Smith speaking". The user, seeking access to the facilities creates the second personal access code by audibly uttering words or sounds into the microphone between the words "this" and "speaking" for example. Alternately the user may be required to audibly utter the words or sounds between the words "telephone" and "Smith". In the manner explained hereinabove the audible uttering are then converted to the second personal access code. The first and second personal access codes are then compared in comparator VGL. If there is a match of the first and second personal access codes then the user seeking access to the facilities will be provided access to the authorized user apparatus MZ by the controller ST. The first and second personal access codes need not match each other exactly. In FIG. 3C the "1" level signal is not a "1" during the first pulse in the authorized user signal shown in FIG. 3B. Thus, a user producing the pattern in FIG. 3C will not be considered an authorized user.

Thus, during the playing back of the text by the announcement module AS to a user trying to gain access to the facility, the user must repeat during a preselected portion of the playing back (step S-9), the freely selectable words or word portions or sounds previously used to form the first personal access code that is stored in memory S for the authorized users during step S-6 and S-7. When these sounds are uttered by the user trying to gain access to the system, the level detector PD and the evaluation circuit ALK generate the second personal access code based on the sounds uttered by the user trying to gain access to the system (step S-10).

In a subsequent evaluation (in step S-11) the first and second personal access codes are compared in comparator VGL (FIG. 1). If the compared personal access codes correspond to each other (step S-11), the telephone answering set will be switched (step S-12) to a remote inquiry mode (step S-13) wherein apparatus MZ will be made accessible to authorized users. In case of disagreement or in the absence of a pre-stored access code, the telephone answering set will be switched to a recording mode step (S-14), in which mode a caller can leave a message, which is stored (step S-15) in the memory of the telephone answering set. This message is retrievable at any time, e.g., by an authorized user in the remote inquiry mode of the telephone answering set.

The first personal access code generated prior to start-up can be replaced at any time by deleting the old code and generating a new one.

Instead of being used in a telecommunications terminal, the apparatus 11 of FIG. 1 can be used in a data terminal equipment.

To increase the safety from unauthorized use, the user can be requested to additionally enter an audible password which is compared with a previously stored password for an authorized user which was stored in identification circuit 10 of FIG. 1. This password can be used for voice recognition or speaker identification by being compared with a stored word. Only if there is additional agreement between these words will access be permitted through controller ST.

In another technique for increasing the safety from unauthorized users, the user can be requested to additionally enter a personal identification number (PIN) in the form of digits which is included in identification circuit 10. This PIN code can be entered by dual tone multifrequency signaling, for example. In case of additional agreement between the PIN code and a stored PIN code, access will be permitted.

Various changes and modifications may be made, and features described in connection with the described embodiments may be used in any combination, within the scope of the inventive concept.

We claim:

1. A method for controlling access to a facility having acoustic input and output means, comprising:

generating a first personal access code that is produced responsive to both a timing and a pattern of an audible uttering of one of a plurality of authorized users of at least one of freely selectable words and sounds during a playing of a pre-recorded text provided by the one authorized user;

storing the first personal access code in a memory for the plurality of authorized users;

subsequently playing back said pre-recorded text to a subsequent user trying to gain access to the facility, without indication how and when said subsequent user should repeat the audible uttering of said one of said plurality of authorized users of at least one of said freely selectable words and sounds during said subsequent playing back of said pre-recorded text;

generating a second personal access code, responsive to said subsequent user audibly uttering said at least one of said freely selectable words and sounds during said subsequent playing back of said pre-recorded text;

comparing said first and second personal access codes with each other; and providing said subsequent user with access to the facility only if said first and second personal access codes correspond with each other in both the pattern thereof and the timing of the audible uttering of said freely selectable words and sounds during the playing back of the pre-recorded text.

2. The method as claimed in claim 1, wherein the at least one of freely selectable words and sounds uttered by said one authorized user must be uttered by said subsequent user at a portion of said pre-recorded text that corresponds in time in said text to the uttering of said one authorized user in order for the first and second personal access codes to correspond with each other.

3. The method as claimed in claim 2, further comprising the additional steps of:

storing a first personal identification number for each one of said plurality of authorized users;

requiring each subsequent user seeking access to the facility to enter a second personal identification number; and providing access to the facility to said subsequent user only if the stored personal identification number corresponds to the second personal identification number entered by said subsequent user seeking access to the facility.

4. The method as claimed in claim 1, comprising the additional steps of:

storing a first personal identification number for each one of said plurality of authorized users;

requiring each subsequent user seeking access to the facility to enter a second personal identification number; and providing access to the facility to said subsequent user only if the stored personal identification number corresponds to the second personal identification number entered by said subsequent user seeking access to the facility.

5. The method as claimed in claim 1, further comprising:

performing at least one of a voice recognition identification of said subsequent user and a speaker identification of said subsequent user by:

requiring said subsequent user to repeat a word that was previously stored in the memory; and comparing the word previously stored in the memory with the word repeated by said subsequent user to determine whether a correspondence exists between the compared words.

6. Apparatus for controlling access to a facility having acoustic input and output means, comprising:

generating means for generating a first personal access code for a plurality of authorized users of the facility, said first personal access code being provided by an evaluation means included in said generating means in response to an audible uttering of one of said plurality of authorized users, of at least one of freely selectable words and sounds during a playing of a pre-recorded text;

storing means including a memory for storing the first personal access code;

playback means for subsequently playing back said pre-recorded text to a subsequent user seeking to gain access to the facility, without indicating to said subsequent user how and when, said subsequent user should repeat the audible uttering of said one of said authorized users, of at least one of the freely selectable words and sounds during said subsequent playing back of said pre-recorded text;

said generating means generating a second personal access code, responsive to an audible uttering of said subsequent user of said at least one of said freely selectable words and sounds during said subsequent playing back of said pre-recorded text;

said generating means including an evaluation means and a comparator for comparing said first and second personal access codes with each other; and accessing means connected to said generating means for providing access to the facility to said subsequent user only if said compared first and second personal access codes correspond with each other in both the pattern thereof and the timing of the audible uttering of said freely selectable words and sounds during the playing back of the pre-recorded text.

7. The apparatus according to claim 6, wherein the acoustic input means comprises:

a microphone for receiving said audible uttering of said subsequent user, and wherein said generating means further includes:

a level detector coupled to said microphone for detecting a level of said audible uttering of said subsequent user received by said microphone;

said level detector detecting said level of said audible uttering of said subsequent user and providing a level detector output signal responsive to said audible uttering of said subsequent user;

said evaluation means including an evaluation logic circuit, said evaluation logic circuit being coupled to said level detector for evaluating said level detector output signal and for generating said first personal access code for said plurality of authorized users, responsive to said level detector output signal, said first personal access code being stored in said memory;

said memory being connected to said evaluation logic circuit;

said evaluation logic circuit further providing said second personal access code when said subsequent user seeking access to the facility audibly utters said words and sounds into said microphone during the subsequent playing back of said pre-recorded text;

said evaluation logic circuit being connected to provide said second personal access code to said comparator;

said memory being connected to said evaluation logic circuit to receive and store said first personal access code therein and to supply said first personal access code to said comparator;

said comparator being provided in said evaluation means for comparing said first and second personal access codes and providing a comparator output signal that is provided to a controller included in said accessing means, said comparator output signal indicating whether the compared first and second personal access codes correspond to each other;

said controller included in said accessing means providing access to said facility to said subsequent user if the first and second personal access codes correspond to each other;

said controller being coupled through an announcement module to a loudspeaker of the acoustic output means; and said announcement module playing back said pre-recorded text to said subsequent user through said loudspeaker.

8. The apparatus according to claim 7, wherein said apparatus is included in a data processing terminal.

9. The apparatus according to claim 7, wherein said first and second personal access codes provided by the evaluation logic circuit correspond to each other only if at least one of the audibly uttered words and sounds by said subsequent user are uttered at a portion of the text that corresponds in time in said pre-recorded text to the uttering of said one of said plurality of authorized users, as said pre-recorded text is being played back to said subsequent user by the playback means.

10. The apparatus according to claim 7, further comprising:

identification means for providing one of a voice recognition identification and a speaker identification for each of said plurality of authorized users, and wherein an identification of each authorized user is stored in said memory.

11. The apparatus according to claim 10, wherein:

said identification means stores the first personal identification number for each of said plurality of authorized users; and wherein said subsequent user seeking access to the facility inputs a second personal identification number into the apparatus, access to the facility being provided to said subsequent user only if the first and second personal identification numbers are identical to each other, and the compared first and second personal access codes correspond with each other.

12. The apparatus according to claim 7, further comprising:

identification means for storing a first personal identification number for each of the plurality of authorized users; and wherein said subsequent user seeking access to the facility inputs a second personal identification number into the apparatus, access to the facility being provided to said subsequent user only if both the first and second personal identification numbers are identical to each other, and the compared first and second personal access codes correspond with each other.

13. The apparatus according to claim 6, wherein said apparatus is included within a telecommunications terminal.

14. The apparatus according to claim 6, wherein said apparatus is included in a data processing terminal.

15. The apparatus according to claim 6, further comprising:

identification means for providing one of a voice recognition identification and a speaker identification for each of said plurality of authorized users, and wherein an identification of each authorized user is stored in the memory.

16. The apparatus according to claim 12, wherein:

said identification means stores the first personal identification number for each of the plurality of authorized users in said memory; and wherein said subsequent user seeking access to the facility inputs a second personal identification number into the apparatus, access to the facility being provided to said subsequent user, only if both the first and second personal identification numbers are identical to each other, and the compared first and second personal access codes correspond with each other.

17. The apparatus according to claim 6, further comprising:

identification means for storing a first personal identification number for each of said plurality of authorized users in said memory; and wherein said subsequent user seeking access to the facility inputs a second personal identification number into the apparatus; and access to the facility being provided to said subsequent user only if both the first and second personal identification numbers are identical to each other, and the compared first and second personal access codes correspond with each other.

* * * * *